(12) United States Patent
Lau

(10) Patent No.: US 7,672,071 B2
(45) Date of Patent: Mar. 2, 2010

(54) SERVO FIELD PREAMBLE DETECTOR AND METHODS FOR USE THEREWITH

(75) Inventor: King Wai Thomas Lau, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 848 days.

(21) Appl. No.: 11/513,686

(22) Filed: Aug. 30, 2006

(65) Prior Publication Data

US 2007/0285817 A1 Dec. 13, 2007

Related U.S. Application Data

(60) Provisional application No. 60/813,114, filed on Jun. 12, 2006.

(51) Int. Cl.
*G11B 5/09* (2006.01)
*G11B 20/10* (2006.01)
*G11B 5/02* (2006.01)
*G11B 21/02* (2006.01)

(52) U.S. Cl. .............................. 360/27; 360/39; 360/75; G9B/5.218

(58) Field of Classification Search ............... G9B/5.218
See application file for complete search history.

(56) References Cited

U.S. PATENT DOCUMENTS

| | | | | |
|---|---|---|---|---|
| 5,231,544 A | * | 7/1993 | Matsushige | 360/46 |
| 5,793,548 A | * | 8/1998 | Zook | 360/51 |
| 5,966,415 A | * | 10/1999 | Bliss et al. | 375/350 |
| 6,882,486 B1 | * | 4/2005 | Kupferman | 360/51 |

* cited by examiner

*Primary Examiner*—Daniell L Negrón
(74) *Attorney, Agent, or Firm*—Garlick Harrison & Markison; Bruce E. Stuckman

(57) ABSTRACT

A servo field preamble detector includes an upsampling module that generates a plurality of upsampled read samples by upsampling a read signal by an upsampling factor. An interpolation filter module generates a plurality of interpolated read samples from the plurality of upsampled read samples. A peak detection module identifies a plurality of peak samples from the plurality of interpolated read samples. A magnitude estimation module generates a magnitude estimation signal from the plurality of peak samples. A comparison module compares the magnitude estimation signal to a magnitude threshold and asserts a servo preamble detection signal when the magnitude estimation signal compares favorably to the magnitude threshold.

21 Claims, 9 Drawing Sheets

SERVO FIELD PREAMBLE DETECTOR AND METHODS FOR USE THEREWITH

CROSS REFERENCE TO RELATED PATENTS

This invention is claiming priority under 35 USC §119(e) to a provisionally filed patent application having the same title as the present patent application, a filing date of Jun. 12, 2006, and an application number of 60/813,114.

BACKGROUND OF THE INVENTION

1. Technical Field of the Invention

The present invention relates to servo field detectors, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

As a magnetic hard drive is manufactured the disk is pre-recorded at the factory, servo data is recorded on the disk in a plurality of servo wedges that are contained in radial segments about the disk. For each track on the disk, each servo wedge contains a servo field that is recorded with a preamble, a synchronization mark and servo data. Examples of servo data include a servo address mark, wedge number, track number, and burst data used by a disk controller to control the rotation of the disk and the position of the read/write heads of the disk drive. The preamble is traditionally coded with a 2T pattern of alternating 1's and 0's that is recorded on the magnetic medium of the disk. The read channel of the disk drive detects the beginning of a servo wedge by detecting the presence of the preamble.

Traditionally, the preamble of the servo field is detected using a sinusoidal matched filter that corresponds to the read signal generated by the read heads in response to the preamble pattern when the disk is at steady state. However, a frequency offset in the read signal, such as during a cold start of the drive, can easily cause a preamble to be missed. Missing the preamble causes the disk controller to miss the entire servo field, denying the disk controller information it uses to generate accurate timing and control information. Further limitations and disadvantages of conventional and traditional approaches will become apparent to one of ordinary skill in the art through comparison of such systems with the present invention.

SUMMARY OF THE INVENTION

The present invention sets forth a servo field preamble detector and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
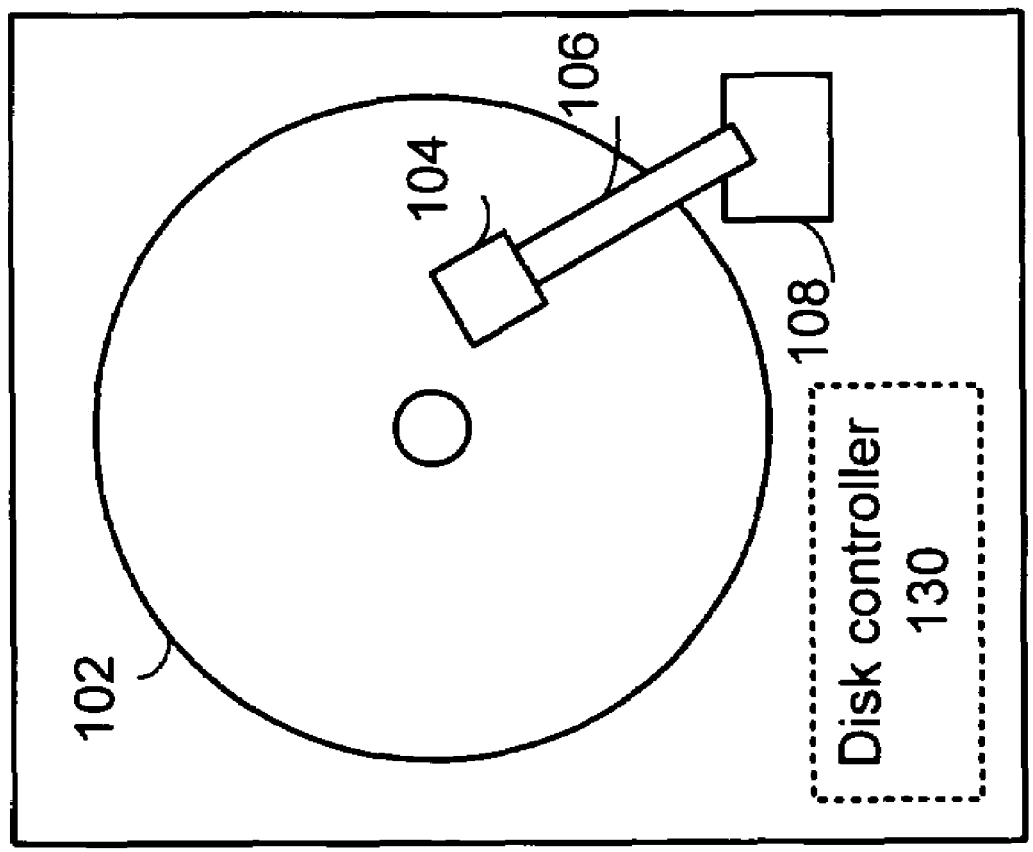
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. In an embodiment of the present invention, the read/write heads 104 include a write element, such as a monopole write element that writes data on the disk with perpendicular magnetic recording (PMR), longitudinal magnetic recording (LMR) or other recording orientation. This allows for greater recording density and greater storage capacity for the drive. However, other recording configurations can likewise be used within the broad scope of the present invention.

A disk controller 130 is included for controlling the read and write operations to and from the drive, for controlling the speed of the servo motor and the motion of actuator 108, and for providing an interface to and from the host device.

Disk controller 130 includes a read channel having a servo field preamble detector in accordance with one or more functions or features of the present invention, as described in further detail in conjunction with the figures that follow.

Figure 2:
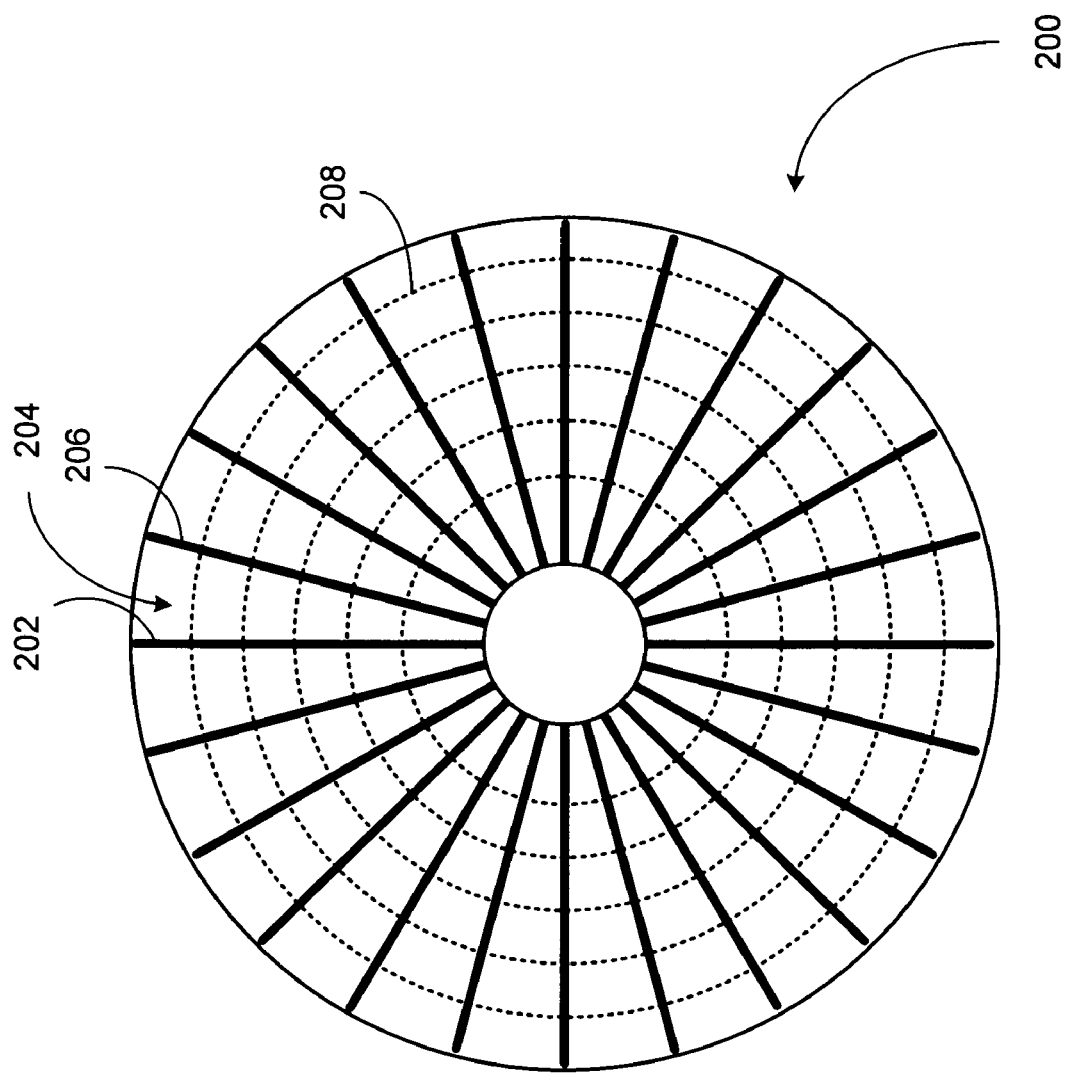
FIG. 2 presents a pictorial representation of a disk 200 having a plurality of servo wedges and a plurality of tracks in accordance with an embodiment of the present invention.

FIG. 2 presents a pictorial representation of a disk 200 having a plurality of servo wedges and a plurality of tracks in accordance with an embodiment of the present invention. In particular, disk 200, such as disk 102, is recorded during an initialization, either in a the factory when the disk drive 100 is manufactured, or during some disk reformatting/recovery operation. Twenty-four radial servo wedges, including adjacent servo wedges 202 and 206, are written on the disk 200. While the servo wedges are represented as linear, non-linear configurations including arcs can also be employed, particularly when disk 200 is implemented in a disk drive, such as disk drive unit 100 that includes an arm 106 that is moved by actuator 108 over the surface of the disk 200 by rotation. Further, while 24 servo wedges are shown for illustration purposes, greater numbers of servo wedges, such as two hundred or more can be employed.

Five tracks, including track 208, are shown for illustrative purposes, however, a far greater number of tracks would be employed in an actual implementation. Each servo wedge includes a servo field associated with each track. One or more sectors of user or control data are stored along the track between consecutive servo wedges. Further details regarding the contents of a servo field are presented in conjunction with FIG. 3.

Figure 3:
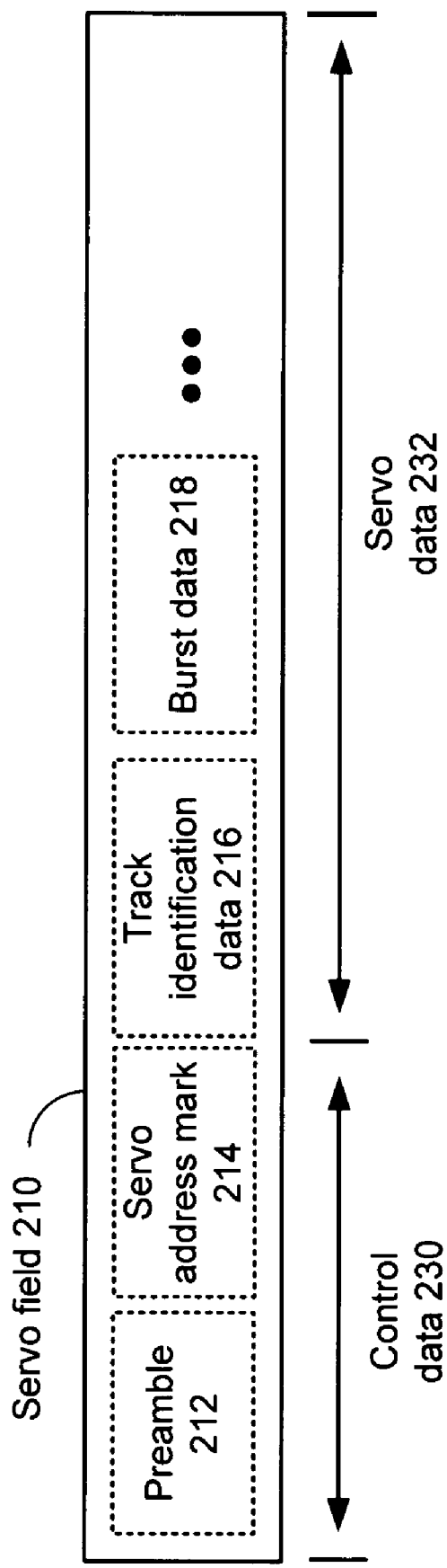
FIG. 3 presents a block diagram representation of a servo field 210 in accordance with an embodiment of the present invention.

FIG. 3 presents a block diagram representation of a servo field 210 in accordance with an embodiment of the present invention. In particular, a servo field typically includes a preamble 212 and servo address mark 214 that allow the read/write channel 140 to recognize the beginning of the servo field 210. An index mark can optionally be included to indicate a particular servo wedge that is the first or "index" wedge for easy decoding by the disk controller 130. Servo data 232 includes track identification data 216 for identifying the particular track being read, burst data 218 for providing subtrack head alignment data that facilitates control to a track centerline and to facilitate track seek movements of the read/write head, etc. In addition, a servo address mark 220 is used for timing generation in the disk controller 130 to time the start time for various events, such as write operations, synchronous identification of a servo wedge during spin-up of the disk, etc. While not shown, the servo data can also include other data including a head number for a multi-head disk drive, and a wedge number that identifies the current wedge, etc.

The preamble 212 is recorded on the disk 200 as an alternating pattern of 1's and 0's, such as a 2T pattern for easy detection. These 1 and 0 patterns can be recorded using partial response signaling and encoded with pulses such as PR1, PR4, EPR4 pulses, etc. When this data is read by the read heads of the disk drive 100 and processed by the read channel this preamble 212 appears as a sinusoidal signal having a frequency that is dependent upon the rotational velocity of the drive and the particular alternating pattern that is employed.

Figure 4:
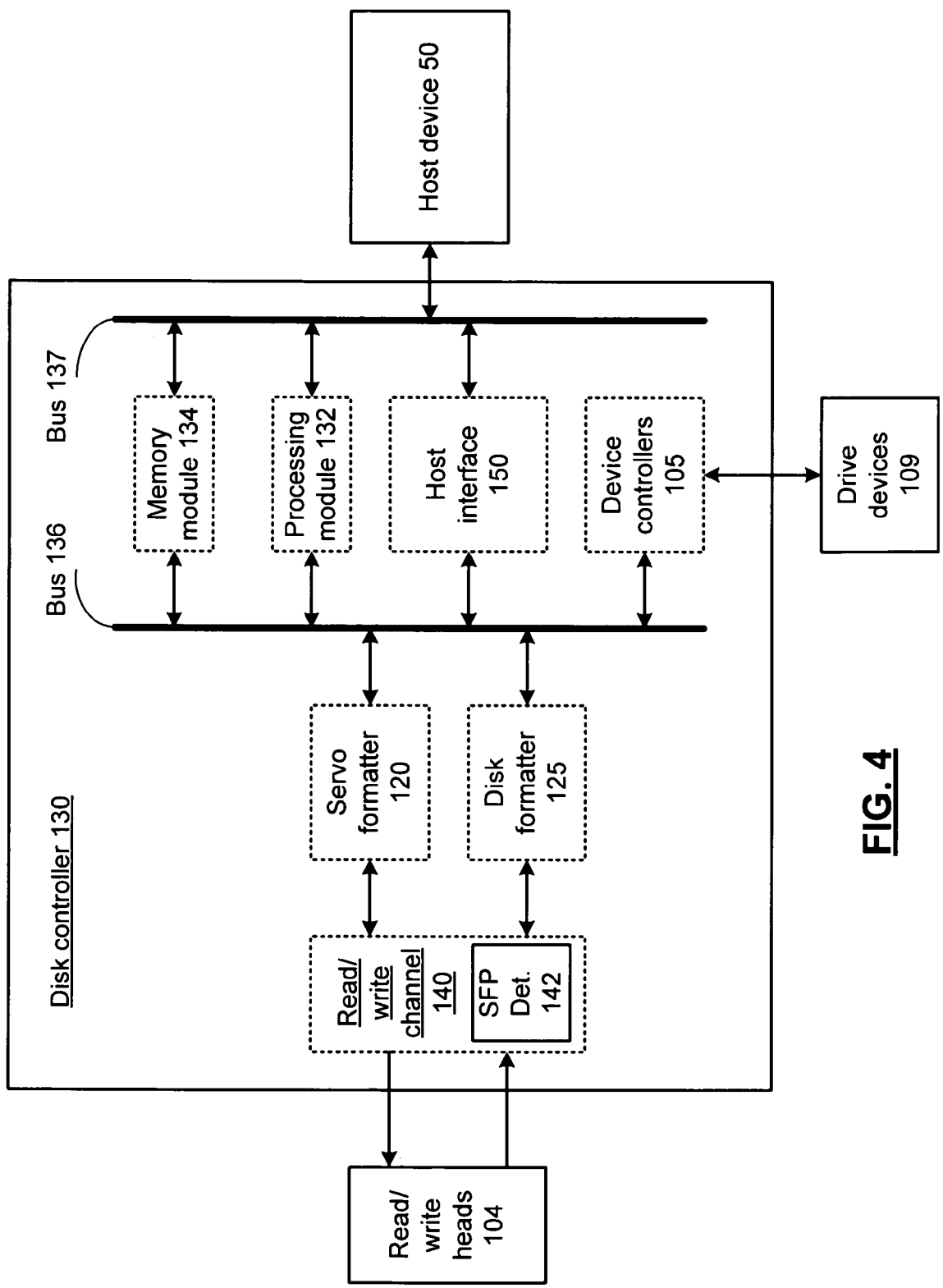
FIG. 4 presents a block diagram representation of a disk controller 130 in accordance with an embodiment of the present invention.

FIG. 4 presents a block diagram representation of a disk controller 130 in accordance with an embodiment of the present invention. In particular, disk controller 130 includes a read/write channel 140 for reading and writing data to and from disk 102 through read/write heads 104. Read/write channel 140 includes a servo field preamble detector 142 that detects the presence of a servo field preamble 212 by detecting the particular sinusoidal pattern in the read signal that is generated in response to the recorded preamble data. As opposed to the match filter methods of the prior art, the present invention uses upsampling to generate a higher resolution signal. The peaks of the signal are detected and the convolved with a signal of alternating polarity to obtain an estimated magnitude, that is compared with a magnitude threshold. The use of this upsampling technique reduces the detector's dependency on the frequency of the sinusoidal signal, providing more accurate preamble detection in conditions, such as cold start, where the rotational velocity of the spindle motor has not yet reached steady state conditions, and/or the frequency of the timing clock has not achieved lock, etc.

Disk formatter 125 is included for controlling the formatting of data and provides clock signals and other timing signals that control the flow of the data written to, and data read from disk 102. In particular, read/write channel 140 is operably coupled to the read/write head to read the servo data 118 from the disk. Servo formatter 120 is operably coupled to the read/write channel 140 to generate timing and position signals 116 based on the servo data 118 that is read, so that device controllers 105 can control the operation of the plurality of drive devices based on the timing and position signals 116.

In an embodiment of the present invention, the read/write channel includes a repetition decoder, majority logic detection, matched filter, correlator, integrator and/or maximum likelihood detector for decoding gray-coded track identification data 216 and the burst data 218. This servo data is used to extract the track number, by gray decoding the track identification data. In addition, subtrack position is determined based on the relative magnitudes of A, B, C, and D data bursts 218. Further details regarding the subtrack control and positioning are presented in U.S. Pat. No. 6,108,151, Sampled Amplitude Read Channel for Reading User Data and Embedded Servo Data from a Magnetic Medium, filed on Apr. 25, 1997.

In addition, the servo formatter 120 generates timing information based on the detected servo address mark 220 for use by device controllers 105 for controlling the actuator 108 and spindle motor, and optionally for generating other timing information used by disk formatter 125 and read/write channel 140 in timing of disk write operations. Further details regarding the use of servo address mark 220 in such timing operations are presented in pending U.S. patent applications Disk controller and methods for use therewith, having Ser. No. 11/311,725; Media event timer and methods for use therewith, having Ser. No. 11/311,727; and Read/write timing generator and methods for use therewith, having Ser. No. 11/311,726.

Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

Figure 5:
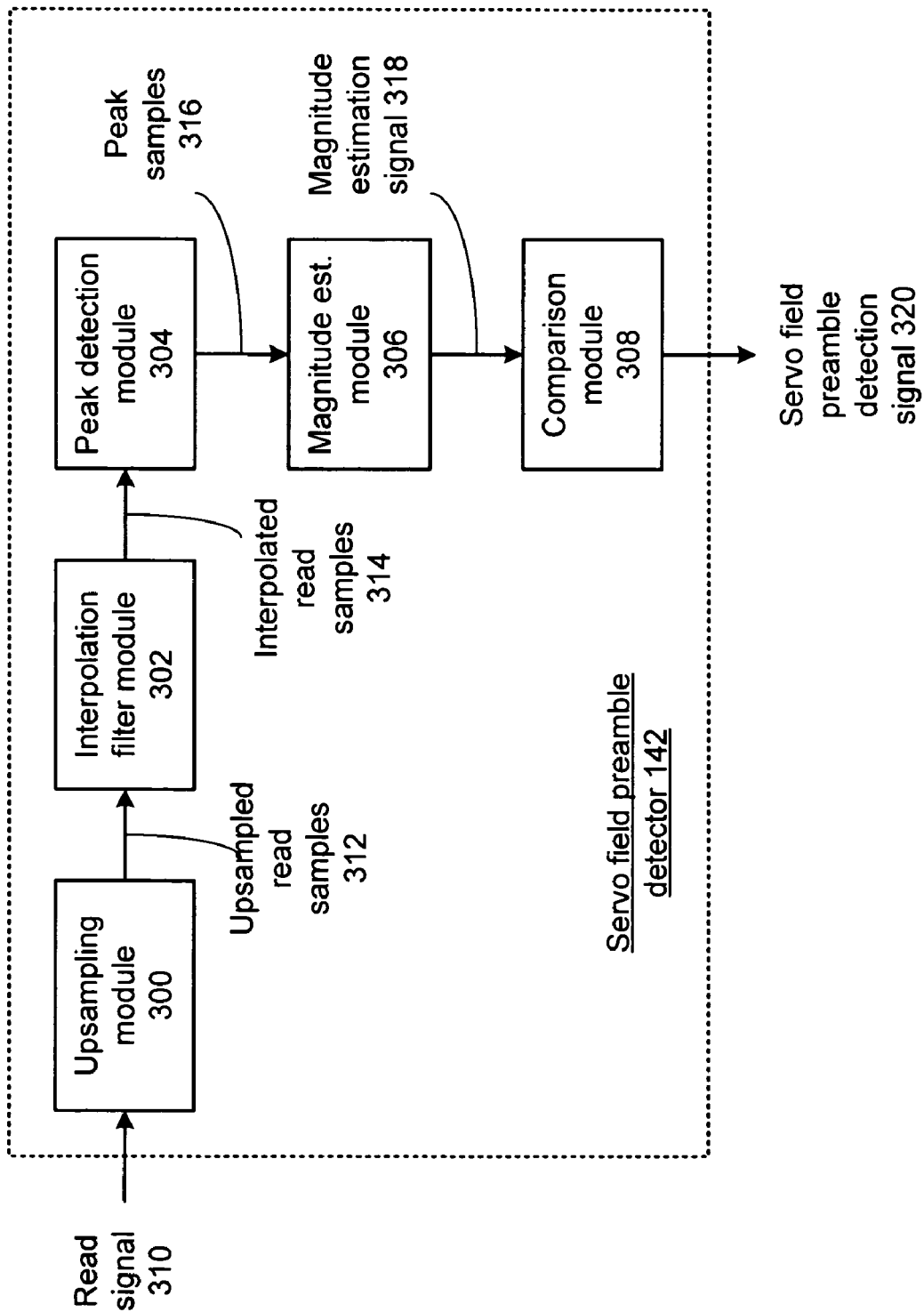
FIG. 5 presents a block diagram representation of a servo field preamble detector 142 in accordance with an embodiment of the present invention.

FIG. 5 presents a block diagram representation of a servo field preamble detector 142 in accordance with an embodiment of the present invention. In particular, servo field preamble detector 142 includes an upsampling module 300 that generates a plurality of upsampled read samples by upsampling a discrete-time read signal by an upsampling factor. Considering the read signal 310 as a discrete time signal f(k), the upsampled read samples 312 can be represented as g(n) where: g(n)=f(n/L), if n/L is an integer, and otherwise g(n)=0. In an embodiment of the present invention, an integer upsampling factor L is used, such as L=4, 6, 8, 12, 16, . . . however, other values of L including integer values can likewise be employed.

Interpolation filter module 302 generates a plurality of interpolated read samples 314 from the upsampled read samples 312. In an embodiment of the present invention, the interpolation filter 302 is an ideal filter has an impulse response that is a finite sinc (sin(x)/x) function, however, other interpolation filters including non-ideal filters can likewise be used within the broad scope of the present invention.

Peak detection module 304 identifies a plurality of peak samples 316 from the plurality of interpolated read samples 316. This can be accomplished in different ways, as will be described further in conjunction with FIG. 6. For instance, the peak detection module 304 can begin by identifying one of the plurality of peak samples 316 by comparing the magnitude of successive ones of the plurality of filtered samples 314. Once a peak is found, the peak detection module 304 can look for the next peak around the sample that is L samples away. However, given an offset in frequencies between the actual and ideal read frequencies, this next peak, that may be have a positive or negative value, may be one or more neighboring samples away. Again, comparing the magnitude of the sample with j neighboring samples (for instance, j=2, 3, 4, 6, . . . ), can determine the position of the next peak, and so on.

Magnitude estimation module 306 generates a magnitude estimation signal 318 from the plurality of peak samples 316. In an embodiment of the present invention, Magnitude estimation module 306 convolves the plurality of peak samples 316 by a sequence of alternating polarity (1, −1, 1, −1, etc.) and calculates the absolute magnitude of the result to generate magnitude estimation signal 318. In particular, the signs of alternating peaks are inverted and summed over a sliding window of W successive peak samples 316 (where W=4, 6, 8, 12, or 16, etc., either an integer power of two or other integer). In the event that the sinusoidal preamble signal is present, the peaks alternate. Convolving the peaks by the alternating polarity sequence causes the magnitude of the samples to add constructively. Taking the absolute magnitude of this sum yields a magnitude estimation signal 318 that is a relatively large positive number in response to a preamble signal being read and a smaller number in response to other signals, data, etc. being read.

Comparison module 308 compares the magnitude estimation signal 318 to a magnitude threshold and asserts a servo preamble detection signal 320 when the magnitude estimation signal compares favorably to the magnitude threshold. In an embodiment of the present invention, comparison module 308 asserts servo preamble detection signal 320 when the magnitude estimation signal exceeds the magnitude threshold. The magnitude threshold can be designed based on the desired probabilities of a false positive and false negative indication in the presence of expected noise, frequency variation, and other disturbances.

In the event that the preamble is not detected, the detection window of detection estimation module 306 moves to encompass the newest peak sample 316 and to eliminate the oldest peak sample 316, an updated magnitude estimation signal 318 is generated and fed to comparison module 308. If the preamble is detected, the assertion of the servo field detection signal 320 can be used by read/write channel 140 to begin the search for the sync mark 214 that is used to synchronize the decoding of the servo data 232.

Figure 6:
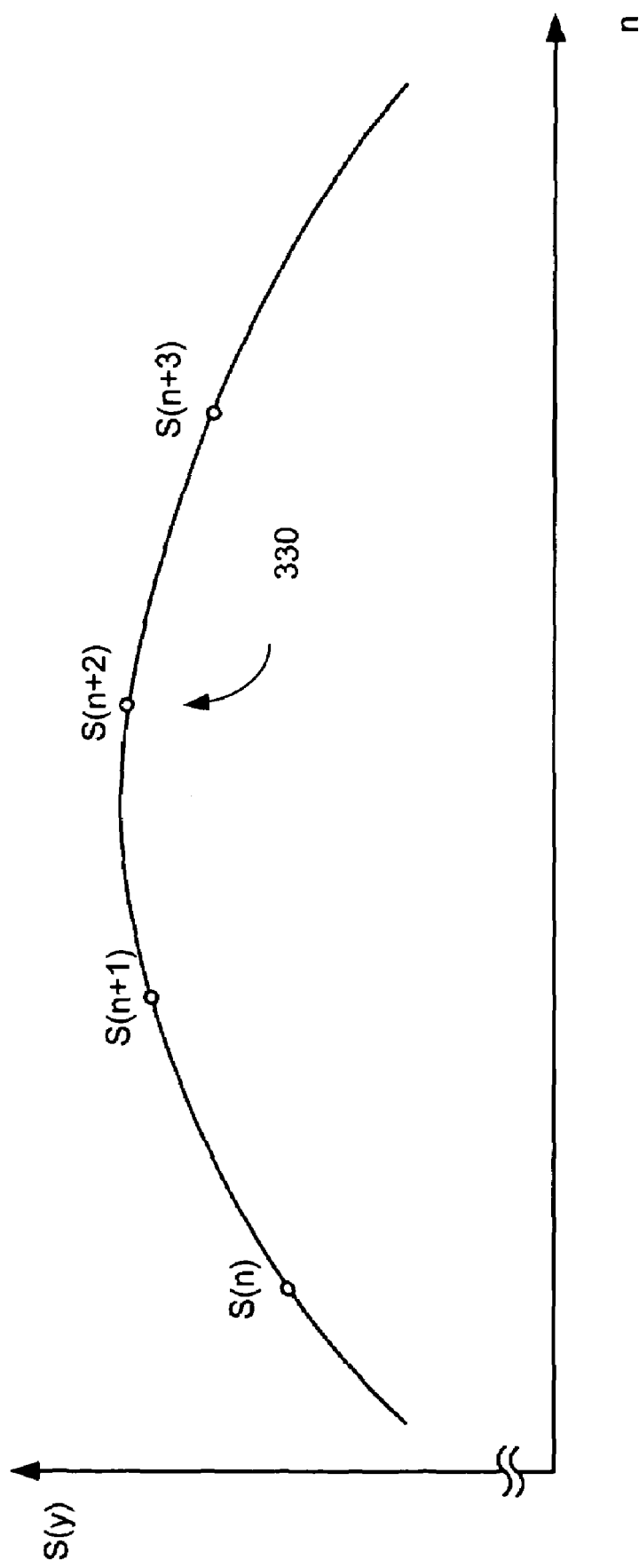
FIG. 6 presents a graphical representation of the operation of peak detection module 304 in accordance with an embodiment of the present invention.

FIG. 6 presents a graphical representation of the operation of peak detection module 304 in accordance with an embodiment of the present invention. In particular, an example is presented that represents a neighborhood of four interpolated read samples 314 as samples {S(n), S(n+1), S(n+2) and S(n+3)}. It should be noted that the magnitudes of neighboring samples can be compared in different ways to determine that a particular sample corresponds to a peak. In particular, the plurality of neighboring samples {S(n), S(n+1), S(n+2) and S(n+3)} can be compared to identify the sample 330 (in this case S(n+2)) with the greatest absolute magnitude. In the alternative, peak detection module 304 can identify peak samples by calculating a plurality of successive gradients and detecting an inversion in the polarity between two successive gradients of the plurality of successive gradients. In this case, the first gradient S(n+1)−S(n) is positive, and S(n+2)−S(n+1) is also positive. However, S(n+3)−S(n+2) is negative, indicating the passage of the peak along the interval between [(n+3), (n+1)]. In this circumstance the peak 330 can be estimated by the intermediate value, S(n+2).

Figure 7:
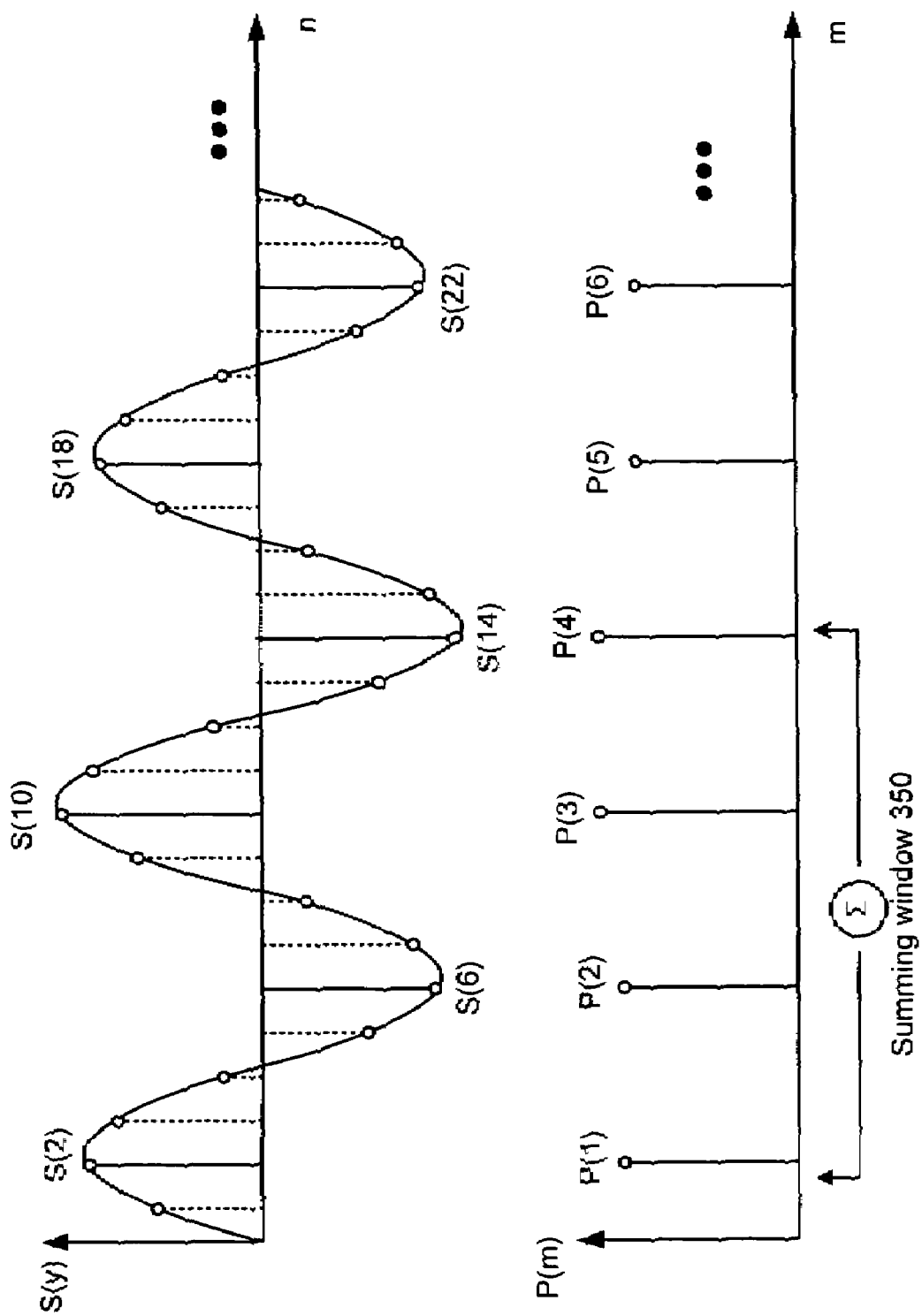
FIG. 7 presents a graphical representation of the operation of magnitude estimation module 306 in accordance with an embodiment of the present invention.

FIG. 7 presents a graphical representation of the operation of magnitude estimation module 306 in accordance with an embodiment of the present invention. In particular, an example is presented that represents a plurality of interpolated read samples 314 as S(y) with y=1, 2, 3 ... 24, expressly shown with an upsampling factor L=4. In this illustration, peak detection module 304 has identified interpolated read samples 314 represented by S(2), S(6), S(10), S(14), S(18) and S(22) as corresponding to peak samples 316. Magnitude estimation module 306 inverts the sign of every other one of the peak samples 316, in this case S(6), S(14) and S(22), to form the values P(m), m=y/L for integer values. In this example, magnitude estimation module 306 forms magnitude estimation signal 318 with a sliding window that calculates the sum of the four preceding values of P(m).

Figure 8:
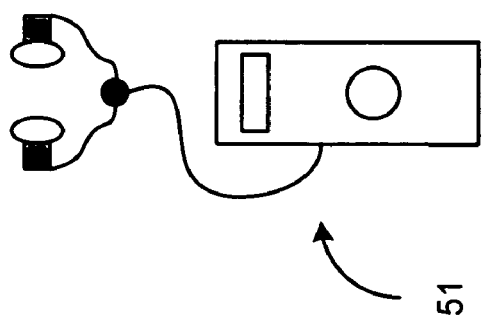
FIG. 8 presents a pictorial representation of a handheld audio unit 51 in accordance with an embodiment of the present invention.

FIG. 8 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 9:
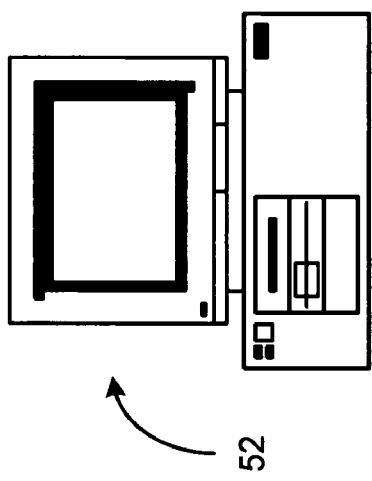
FIG. 9 presents a pictorial representation of a computer 52 in accordance with an embodiment of the present invention.

FIG. 9 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 10:
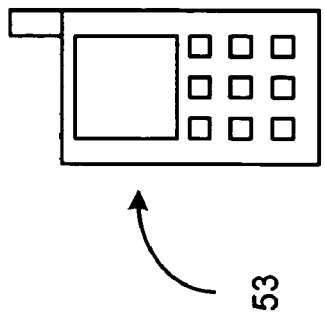
FIG. 10 presents a pictorial representation of a wireless communication device 53 in accordance with an embodiment of the present invention.

FIG. 10 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 11:
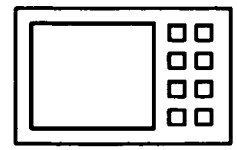
FIG. 11 presents a pictorial representation of a personal digital assistant 54 in accordance with an embodiment of the present invention.

FIG. 11 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 12:
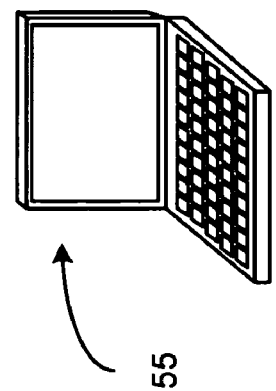
FIG. 12 presents a pictorial representation of a laptop computer 55 in accordance with an embodiment of the present invention.

FIG. 12 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 13:
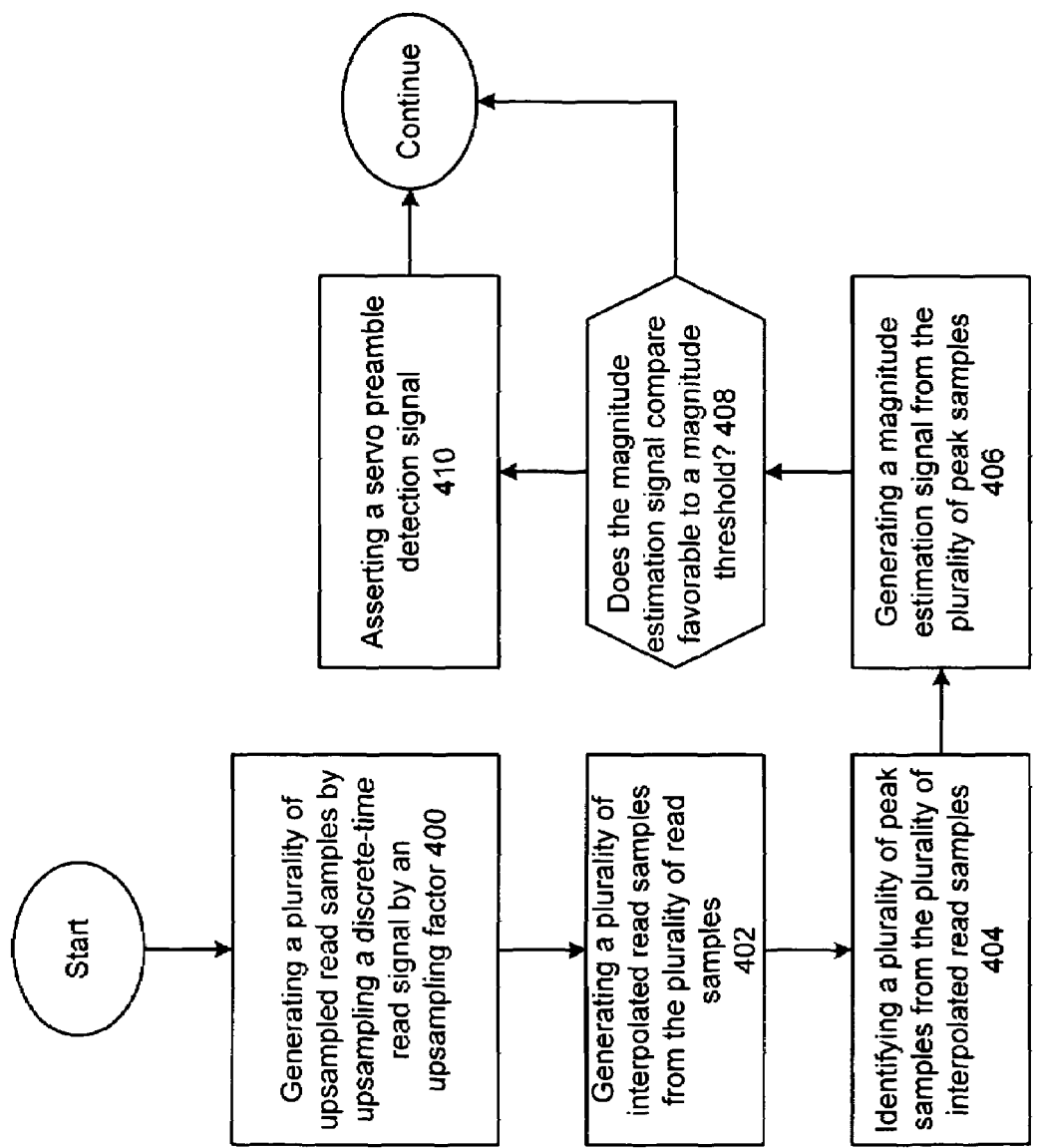
FIG. 13 presents a flowchart representation of a method in accordance with an embodiment of the present invention.

FIG. 13 presents a flowchart representation of a method in accordance with an embodiment of the present invention. In particular, a method is presented that can be used in conjunction with one or more of the features or functions described in association with FIGS. 1-12. In step 400, a plurality of upsampled read samples are generating by upsampling a discrete-time read signal by an upsampling factor. In step 402, a plurality of interpolated read samples are generated from the plurality of upsampled read samples. In step 404, a plurality of peak samples are identified from the plurality of interpolated read samples. In step 406, a magnitude estimation signal is generated from the plurality of peak samples. In step 408, the magnitude estimation signal is compared to a magnitude threshold. In step 410, a servo preamble detection signal is asserted when the magnitude estimation signal compares favorably to the magnitude threshold.

In an embodiment of the present invention, step 402 includes filtering the plurality of upsampled read samples with a filter that has an impulse response that is a finite sinc function. Optionally, step 404 includes identifying one of the plurality of peak samples by comparing the magnitude of successive ones of the plurality of filtered red samples, identifying one of the plurality of peak samples by calculating a plurality of successive gradients, and detecting an inversion in the polarity between two successive gradients of the plurality of successive gradients, and/or identifying one of the plurality of peak samples by identifying one of a plurality of filtered samples with the greatest absolute magnitude. In an embodiment, step 406 generates the magnitude estimation signal based on the sum of n successive peak magnitude signals that, for instance, form a sliding detection window. In the event that the preamble is not detected, the detection window moves to encompass the newest peak sample and to eliminate the oldest peak sample, an updated magnitude estimation signal is generated and fed back to step 408. If the preamble is detected, the assertion of the servo field detection signal can be used, for instance, by the read/write channel of a disk controller to begin the search for a sync mark that is used to synchronize the decoding of the servo data in a servo field.

While the various embodiments described herein focus primarily on the detection of bipolar sinusoidal read signals that result from the reading of preamble 212, unipolar sinusoidal signals, possibly used in conjunction with PMR, can likewise be detected by AC coupling these signals to create a bipolar signal, other by other modifications.

Further, while the various embodiments described herein describe upsampling and interpolating a discrete-time read signal, alternatively the present invention can operate by oversampling a read signal at a sampling frequency that is a multiple M above a Nyquist sampling rate of the read signal, where M is either an integer or a fraction. In this fashion, the peak detection, such as by peak detection module 304, identify the peaks in this oversampled read signal, rather than from interpolated read samples.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a servo field preamble detector that has many uses such as in a disk controller, read/write channel, read channel system on a chip or other portions of a disk drive. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A servo field preamble detector for use in a disk drive, the servo field preamble detector comprising:
   an upsampling module that generates a plurality of upsampled read samples by upsampling a discrete-time read signal by an upsampling factor;
   an interpolation filter module, operably coupled to the upsampling module, that generates a plurality of interpolated read samples from the plurality of up sampled read samples;
   a peak detection module, operably coupled to the interpolation filter, that identifies a plurality of peak samples from the plurality of interpolated read samples;
   a magnitude estimation module, operably coupled to the peak detection module, that convolves the plurality of peak samples by a sequence of alternating polarities to form a plurality of peak magnitude signals and that generates a magnitude estimation signal based on the sum of n successive peak magnitude signals; and
   a comparison module, operably coupled to the magnitude estimation module, that compares the magnitude estimation signal to a magnitude threshold and that generates a servo preamble detection signal when the magnitude estimation signal compares favorably to the magnitude threshold.

2. The servo field preamble detector of claim 1 wherein the interpolation filter module includes an interpolation filter that has an impulse response that is a finite sinc function.

3. The servo field preamble detector of claim 1 wherein the peak detection module identifies one of the plurality of peak samples by comparing the magnitude of successive ones of the plurality of interpolated read samples.

4. The servo field preamble detector of claim 1 wherein the peak detection module identifies one of the plurality of peak samples by calculating a plurality of successive gradients and detecting an inversion in the polarity between two successive gradients of the plurality of successive gradients.

5. The servo field preamble detector of claim 1 wherein the peak detection module identifies one of the plurality of peak samples by identifying one of a plurality of interpolated read samples with the greatest absolute magnitude.

6. The servo field preamble detector of claim 1 wherein n is an integer power of two.

7. A method for use in a disk controller of a disk drive, the method comprising:
  generating a plurality of upsampled read samples by upsampling a discrete-time read signal by an upsampling factor;
  generating a plurality of interpolated read samples from the plurality of upsampled read samples;
  identifying a plurality of peak samples from the plurality of interpolated read samples;
  generating a magnitude estimation signal from the plurality of peak samples;
  comparing the magnitude estimation signal to a magnitude threshold; and
  generating a servo preamble detection signal when the magnitude estimation signal compares favorably to the magnitude threshold.

8. The method of claim 7 wherein the step of generating a plurality of interpolated read samples includes filtering the plurality of upsampled read samples with a filter that has an impulse response that is a finite sinc function.

9. The method of claim 7 wherein the step of identifying a plurality of peak samples includes identifying one of the plurality of peak samples by comparing the magnitude of successive ones of the plurality of interpolated read samples.

10. The method of claim 7 wherein the step of identifying a plurality of peak samples includes identifying one of the plurality of peak samples by calculating a plurality of successive gradients and detecting an inversion in the polarity between two successive gradients of the plurality of successive gradients.

11. The method of claim 7 wherein the step of identifying a plurality of peak samples includes identifying one of the plurality of peak samples by identifying one of a plurality of filtered samples with the greatest absolute magnitude.

12. The method of claim 7 wherein the step of generating a magnitude estimation signal includes multiplying the plurality of peak samples by a sequence of alternating polarities to form a plurality of peak magnitude signals.

13. The method of claim 7 wherein the step of generating a magnitude estimation signal generates the magnitude estimation signal based on the sum of n successive peak magnitude signals.

14. A servo field preamble detector for use in a disk controller of a disk drive, the servo field preamble detector comprising:
  a peak detection module that identifies a plurality of peak samples from a plurality of read samples;
  a magnitude estimation module, operably coupled to the peak detection module, that generates a magnitude estimation signal from the plurality of peak samples, wherein the magnitude estimation module convolves the plurality of peak samples by a sequence of alternating polarities to form a plurality of peak magnitude signals; and
  a comparison module, operably coupled to the magnitude estimation module, that compares the magnitude estimation signal to a magnitude threshold and that generates a servo preamble detection signal when the magnitude estimation signal compares favorably to the magnitude threshold.

15. The servo field preamble detector of claim 14 wherein the interpolation filter module includes an interpolation filter that has an impulse response that is a finite sinc function.

16. The servo field preamble detector of claim 14 wherein the peak detection module identifies one of the plurality of peak samples by comparing the magnitude of successive ones of the plurality of read samples.

17. The servo field preamble detector of claim 14 wherein the peak detection module identifies one of the plurality of peak samples by calculating a plurality of successive gradients and detecting an inversion in the polarity between two successive gradients of the plurality of successive gradients.

18. The servo field preamble detector of claim 14 wherein the peak detection module identifies one of the plurality of peak samples by identifying one of a plurality of read samples with the greatest absolute magnitude.

19. The servo field preamble detector of claim 14 wherein the magnitude estimation module generates the magnitude estimation signal based on the sum of n successive peak magnitude signals.

20. The servo field preamble detector of claim 14 further comprising:
  an upsampling module that generates a plurality of upsampled read samples by upsampling a discrete-time read signal by an upsampling factor; and
  an interpolation filter module, operably coupled to the upsampling module, that generates the plurality of read samples by filtering the plurality of upsampled read samples.

21. The servo field preamble detector of claim 14 wherein the read samples are generated by oversampling a read signal at a sampling frequency that is a multiple M above a Nyquist sampling rate of the read signal.

* * * * *